US011919012B2

(12) United States Patent
Nowicki et al.

(10) Patent No.: US 11,919,012 B2
(45) Date of Patent: Mar. 5, 2024

(54) HIGH PRESSURE FLUID TOOL

(71) Applicant: PDQ Workholding LLC, Columbia City, IN (US)

(72) Inventors: Brian Nowicki, McCordsville, IN (US); Jerry Busche, Columbia City, IN (US); Aaron Schoon, Columbia City, IN (US)

(73) Assignee: PDQ Workholding LLC, Columbia City, IN (US)

(*) Notice: Subject to any disclaimer, the term of this patent is extended or adjusted under 35 U.S.C. 154(b) by 0 days.

(21) Appl. No.: 17/112,146

(22) Filed: Dec. 4, 2020

(65) Prior Publication Data

US 2021/0170428 A1 Jun. 10, 2021

Related U.S. Application Data

(60) Provisional application No. 62/944,519, filed on Dec. 6, 2019.

(51) Int. Cl.
*B05B 1/20* (2006.01)
*B05B 1/14* (2006.01)
*B08B 9/032* (2006.01)

(52) U.S. Cl.
CPC ............ *B05B 1/202* (2013.01); *B08B 9/0321* (2013.01)

(58) Field of Classification Search
CPC ......... B05B 1/046; B05B 1/169; B05B 1/202; B05B 3/06; B05B 9/0321; B05B 13/0627; B08B 9/0321
USPC .......................................................... 239/249
See application file for complete search history.

(56) References Cited

U.S. PATENT DOCUMENTS

| | | | | | |
|---|---|---|---|---|---|
| 436,592 | A * | 9/1890 | Baker et al. | B05B 3/06 | 239/249 |
| 1,901,655 | A * | 3/1933 | Keys | B05B 3/06 | 174/75 F |
| 2,075,702 | A * | 3/1937 | Coles | B05B 3/06 | 239/259 |
| 2,315,844 | A * | 4/1943 | Ferrando | B05B 3/026 | 239/258 |
| 2,466,182 | A * | 4/1949 | Peeps | B05B 7/04 | 239/548 |
| 2,979,272 | A * | 4/1961 | Thorrez | B05B 3/06 | 239/602 |
| 3,448,928 | A * | 6/1969 | Disbrow | F15C 1/22 | 137/841 |
| 4,076,175 | A * | 2/1978 | Bert | B05B 13/0214 | 239/588 |
| 5,535,496 | A * | 7/1996 | Sugino | B05B 15/58 | 408/35 |
| 5,603,378 | A * | 2/1997 | Alford | E21B 41/0078 | 166/191 |

(Continued)

FOREIGN PATENT DOCUMENTS

| | | | |
|---|---|---|---|
| DE | 10 2010 040 642 | A1 | 3/2012 |
| EP | 2 397 251 | A1 | 12/2011 |

*Primary Examiner* — Joseph A Greenlund
(74) *Attorney, Agent, or Firm* — Taylor IP, P.C.

(57) ABSTRACT

A device for directing high pressure fluid includes: a spindle having a rigid body defining a fluid passageway therein; a spindle mount configured to mount the spindle to a fluid source; and a fluid distributer coupled to the spindle and including a plurality of spaced-apart fluid dispensers formed therein that are each fluidly coupled to the fluid passageway and configured to dispense fluid outside the device.

10 Claims, 6 Drawing Sheets

(56) References Cited

U.S. PATENT DOCUMENTS 5,680,990 A * 10/1997 Wang .................... B05B 15/654 239/258
5,895,182 A * 4/1999 Hayashi ............. B23Q 11/0042 409/137
6,905,388 B2 * 6/2005 Schoonmaker ........ A63H 23/10 446/156
7,007,865 B2 * 3/2006 Dodd .................... B05B 1/1672 239/249
9,364,869 B2 * 6/2016 Haremaki ................. B08B 3/02
9,393,627 B2 * 7/2016 Hirasaka ................... B08B 3/04
9,669,420 B2 * 6/2017 Heren ................... B05B 15/622
10,174,592 B2 * 1/2019 Dodd .................. E21B 41/0078
10,406,538 B2 * 9/2019 Bryant ...................... B05B 1/14
11,160,252 B2 * 11/2021 Raia ..................... A01K 13/001
2003/0168523 A1 * 9/2003 Lin ........................... B05B 3/06 239/251
2007/0246568 A1 * 10/2007 Baird .................... B05B 3/0472 239/243
2012/0205405 A1 * 8/2012 Zink ......................... B08B 3/02 251/336
2013/0284827 A1 * 10/2013 Humpal ................ B05B 1/1645 239/549
2014/0263732 A1 * 9/2014 Heren ................... B05B 15/628 239/442
2014/0291419 A1 * 10/2014 Pitsch ................... B05B 1/1681 239/437
2015/0034136 A1 * 2/2015 Bakke ....................... B05B 3/06 134/167 C
2016/0341431 A1 * 11/2016 Topfer ...................... B05B 3/06
2018/0021798 A1 * 1/2018 Pletcher .................... B05B 1/12 239/120
2018/0111175 A1 * 4/2018 Becker ...................... B05B 3/06
2020/0016613 A1 * 1/2020 Hajek ................. B05B 12/1472
2020/0238308 A1 * 7/2020 Forgey .................. B05B 1/3026
2020/0261925 A1 * 8/2020 Schneider ................. E03F 9/00
2021/0060587 A1 * 3/2021 Riepe ........................ B05B 7/12
2021/0170428 A1 * 6/2021 Nowicki ............... F26B 21/004

* cited by examiner

HIGH PRESSURE FLUID TOOL

CROSS REFERENCE TO RELATED APPLICATIONS

This is a non-provisional application based upon U.S. provisional patent application Ser. No. 62/944,519, entitled "HIGH PRESSURE FLUID TOOL", filed Dec. 6, 2019, which is incorporated herein by reference.

BACKGROUND OF THE INVENTION

1. Field of the Invention

The present invention relates to devices for directing fluid, and, more particularly, to devices for directing high pressure fluid.

2. Description of the Related Art

Fluid dispensers are well-known in the art for various purposes. One exemplary purpose is to wash a surface of debris formed, for example, during machining. While such fluid dispensers are effective at washing debris from the surface, not all fluid dispensers are suitable for both dispensing fluid and, for example, deburring the surface after machining.

What is needed in the art is a fluid dispenser that can be used to both clean and debur a surface.

SUMMARY OF THE INVENTION

The present invention provides a device for directing high pressure fluid that has a spindle including a rigid body defining a fluid passageway therein and a fluid distributor coupled to the spindle and having fluid dispensers that are each fluidly coupled to the fluid passageway.

In some exemplary embodiments provided according to the present invention, a device for directing high pressure fluid includes: a spindle having a rigid body defining a fluid passageway therein; a spindle mount configured to mount the spindle to a fluid source; and a fluid distributer coupled to the spindle and including a plurality of spaced-apart fluid dispensers formed therein that are each fluidly coupled to the fluid passageway and configured to dispense fluid outside the device.

In some exemplary embodiments provided according to the present invention, a fluid distribution system includes a fluid source configured to output pressurized fluid and a device including: a spindle including a rigid body defining a fluid passageway therein; a spindle mount mounting the spindle to the fluid source so the fluid passageway of the spindle is fluidly coupled to the fluid source; and a fluid distributer coupled to the spindle and including a plurality of spaced-apart fluid dispensers formed therein that are each fluidly coupled to the fluid passageway of the spindle and configured to dispense pressurized fluid from the fluid source outside the device.

In some exemplary embodiments provided according to the present invention, a method of treating a surface includes: mounting a spindle including a rigid body to a fluid source using a spindle mount such that a fluid passageway formed in the rigid body of the spindle is fluidly coupled to the fluid source; and distributing pressurized fluid from the fluid source through a fluid distributer that is coupled to the spindle and placed adjacent to the surface, the fluid distributer having a plurality of spaced-apart fluid dispensers formed therein that are each fluidly coupled to the fluid passageway of the spindle so the pressurized fluid is dispensed from at least one of the fluid dispensers against the surface.

An advantage of the present invention is that the device and method can be used to clean, flush, dry, and/or debur surfaces of, for example, a workpiece, a part, a machine table, and/or a machine guarding.

Another advantage is the spindle is rigid so high-pressure fluid can be dispensed from the fluid dispensers.

Yet another advantage is flow adjusters can be provided to individually control fluid flow from each of the fluid dispensers and thus control the overall dispensing of fluid.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
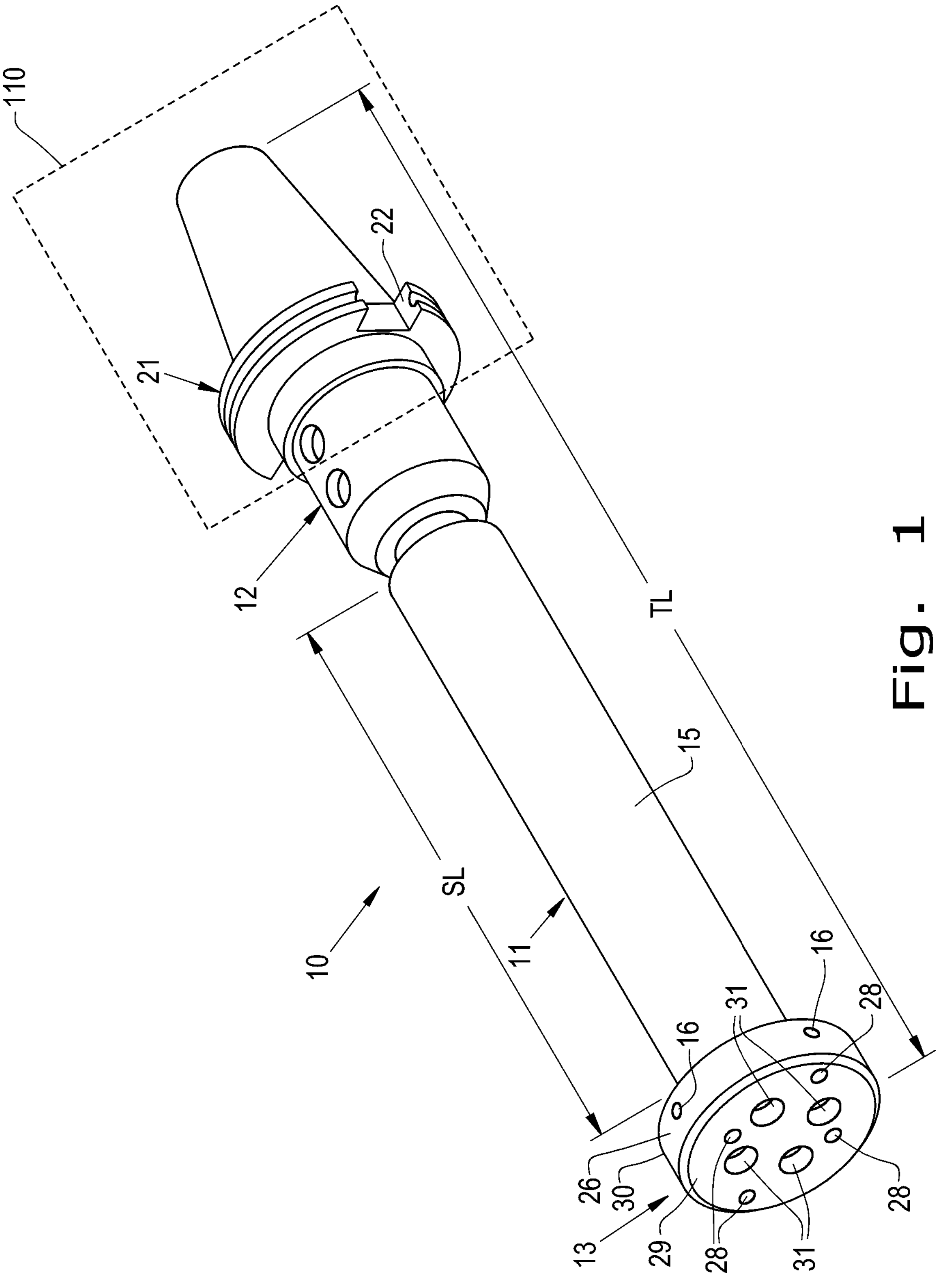
FIG. 1 is a perspective view of an exemplary embodiment of a fluid distribution system including a fluid source and a device for directing high pressure fluid, provided according to the present invention.
Figure 2:
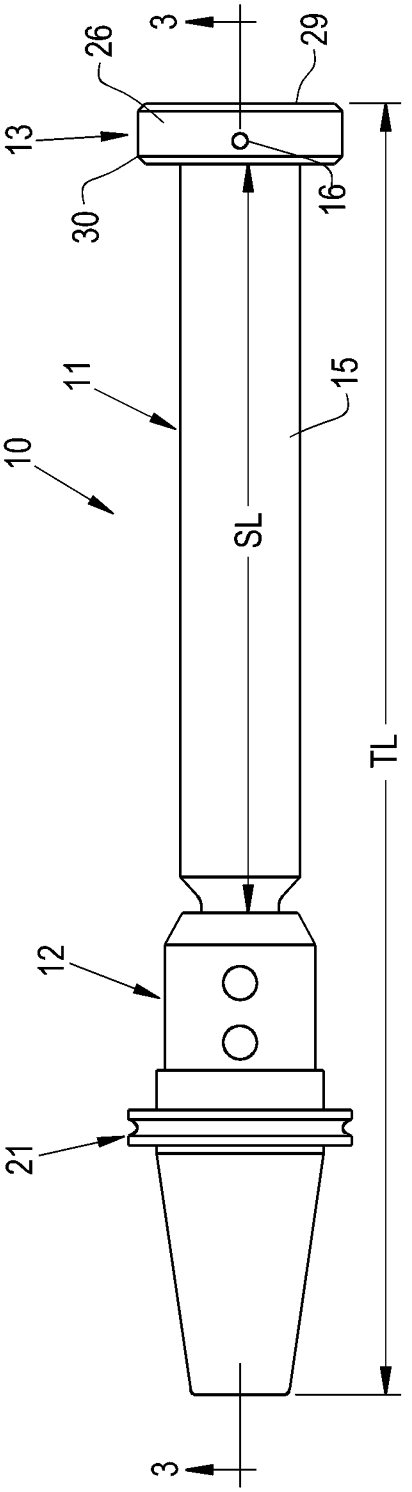
FIG. 2 is a side view of the device illustrated in FIG. 1.

Referring now to the drawings, and more particularly to FIG. 1, there is shown a perspective view of a fluid distribution system 100 including a device 10 for directing high pressure fluid and a fluid source 110, and FIG. 2 illustrates the device 10 in a side view. Device 10 directs fluid (which includes gas, such as air) to a machining operation. Device 10 is referred to as an HP (high pressure) Aqua product 10, which uses directionally optimized, through-the-spindle medium and high pressure coolant, as well as through-the-spindle air pressure in order to clean, flush and dry internal and external surfaces of a workpiece, machine table, or machine guarding. The fluid source 110, which may be a fluid pump or similar element, is configured to output pressurized fluid, which may then be directed by the device 10.

In addition to cleaning, HP Aqua product 10 also will deburr internal workpiece features by way of directionally optimized high-pressure coolant, along with tool diameters and engineered orifice designs in order to maximize the deburring effect of the tools.

The device 10 includes a spindle 11, a spindle mount 12, and a fluid distributer 13. The spindle 11 includes a rigid body 15 that may be formed, for example, from a rigid metal such as aluminum. As used herein, the term “rigid” should be understood to mean that the body 15 is relatively inflexible and does not appreciably flex under its own weight, which is in contrast to, for example, a flexible hose that is readily flexible and bendable. The rigid body 15 may be formed with any suitable diameter. As illustrated, the spindle 11 may define a spindle length SL that is at least 50% of a total length TL of the device 10. Such a length SL of the spindle 11 may be useful when the device 10 is inserted in a part or other area to clean and/or dry a surface that is located deep within the part or area. The rigid body 15 of the spindle 11 may be generally cylindrical, as illustrated, or may have other shapes.

Figure 3:
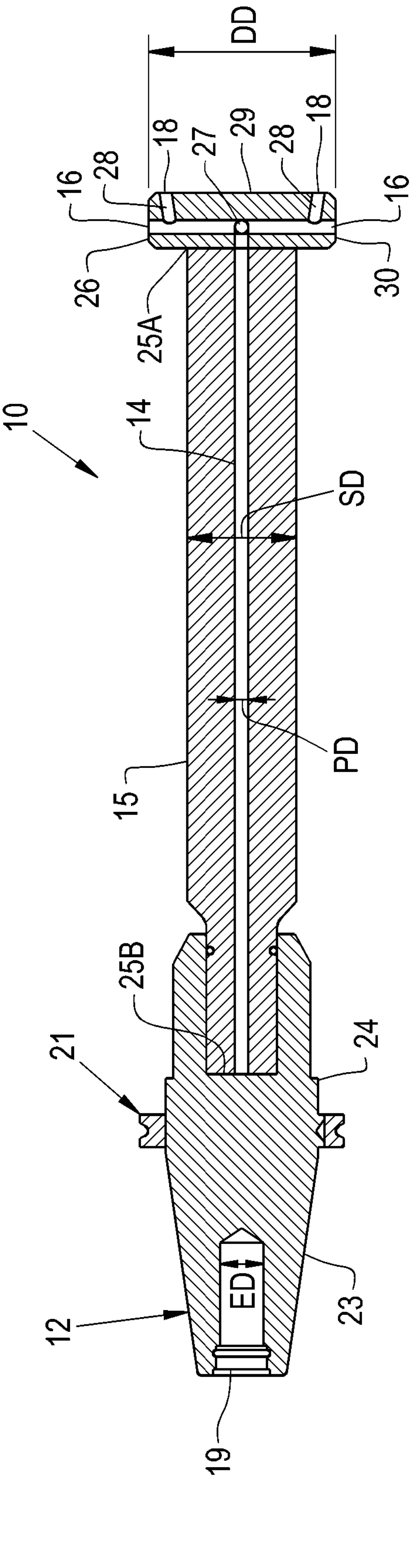
FIG. 3 is a cross-sectional view of the device illustrated in FIG. 2 taken along line 3-3.

Now, additionally referring to FIG. 3 there is illustrated a cross sectional side view that illustrates the spindle mount 12, a fluid passageway 14 defined in the rigid body 15, a plurality of fluid dispensers 16 of the fluid distributer 13, and flow adjusters 18. The spindle mount 12 is configured to mount the spindle 11 to the fluid source 110, as will be described further herein. Fluid enters the fluid passageway 14 through couplings, which may be part of the spindle mount 12, then the fluid travels through the fluid passageway 14 to a plurality of spaced-apart fluid dispensers 16, which are each fluidly coupled to the fluid passageway 14 and may be in the form of nozzles 16 or another fluid dispenser 16 that is configured to dispense fluid outside of the device 10, such as in a concentrated or pattern flow of fluid to a surface, such as a surface of a part. A plurality of flow adjusters 18 may be provided, with each of the flow adjusters 18 being associated with a respective one of the fluid dispensers 16 and configured to control fluid flow from the respective fluid dispenser 16 independently of the other fluid dispensers 16. One or more of the flow adjusters 18 may be, for example, in the form of adjusting screws 18 that are set to control the fluid flow through the fluid dispensers 16.

In the illustrated embodiment of FIGS. 1-3, the spindle mount 12 defines a fluid entryway 19 that is fluidly coupled to the fluid passageway 14 of the spindle 11. The fluid entryway 19 may be formed at an end of the spindle mount 12 and be configured to directly couple with the fluid source 110 to receive pressurized fluid. In some embodiments, the fluid entryway 19 is configured to couple with a hose of the fluid source 110 to fluidly couple the fluid entryway 19, and thus the fluid passageway 14, to the fluid source 110 so pressurized fluid enters the fluid passageway 14. The spindle mount 12 may include one or more mounting features 21, illustrated as radially extending couplings, that can have a cutout 22. The cutout 22 can slide over a corresponding bump in the fluid source 110 and then rotated so the spindle mount 12 locks to the fluid source 110. In some embodiments, the fluid passageway 14 defines a passageway diameter PD and the fluid entryway 19 defines an entryway diameter ED that is greater than the passageway diameter PD. The fluid passageway 14 and the fluid entryway 19 may extend in parallel so fluid flow through the fluid entryway 19 and the fluid passageway 14 does not generally change directions within the spindle 11. While the spindle mount 12 is illustrated as having a conical section 23 and a cylindrical section 24, it should be appreciated that the shape of the spindle mount 12 can be adjusted in order to couple the spindle 12 to a fluid source and thus the illustrated shape of the spindle mount 12 is exemplary only.

The fluid distributer 13 may be mounted to an end 25A of the spindle 11 that is opposite an end 25B of the spindle 11 that is coupled to the spindle mount 12. The fluid dispenser 13 may have a round shape, such as a ring shape, with a circumferential surface 26. The spindle 11 may define a spindle diameter SD and the fluid distributer 13 may define a distributer diameter DD that is greater than the spindle diameter SD, as illustrated.

In some embodiments, the fluid dispensers 16 each extend through the circumferential surface 26 to a distributer channel 27 that is formed in the fluid distributer 13 and fluidly coupled to the fluid passageway 14. In this respect, the distributer channel 27 can fluidly couple each of the fluid dispensers 13 to the fluid passageway 14. The distributer channel 27 and/or the fluid dispensers 13 may each extend perpendicularly to the fluid passageway 14. Each of the flow adjusters 18, which may be adjusting screws or a different element, such as a plug, may be held in an adjuster opening 28 that extends into the distributer channel 27. Each flow adjuster 18 can be displaced within the adjuster opening 28 to move in or out of the distributer channel 27 and alter the fluid flow through the associated fluid dispenser 16. In some embodiments, each flow adjuster 18 has a sufficient length to fluidly isolate its respective fluid dispenser 16 from the fluid passageway 14 by, for example, closing the fluid coupling between the distributer channel 27 and the respective fluid dispenser 16. Thus, it should be appreciated that the flow adjusters 18 can be used to not only adjust the fluid flow characteristics through of the fluid dispensers 16 independently of the other fluid dispensers 16, but can also be used to prevent fluid flow through one or more of the fluid dispensers 16.

In some embodiments, a circular end face 29 of the fluid distributer 13 is coupled to a ring 30 of the fluid distributer 13. The circular end face 29 may be coupled to the ring 30 by a plurality of removable screws 31, which can allow removal of the end face 29 from the ring 30 to clean the inside of the fluid distributer 13. The adjuster openings 28 can also be formed in the end face 29.

Figure 4:
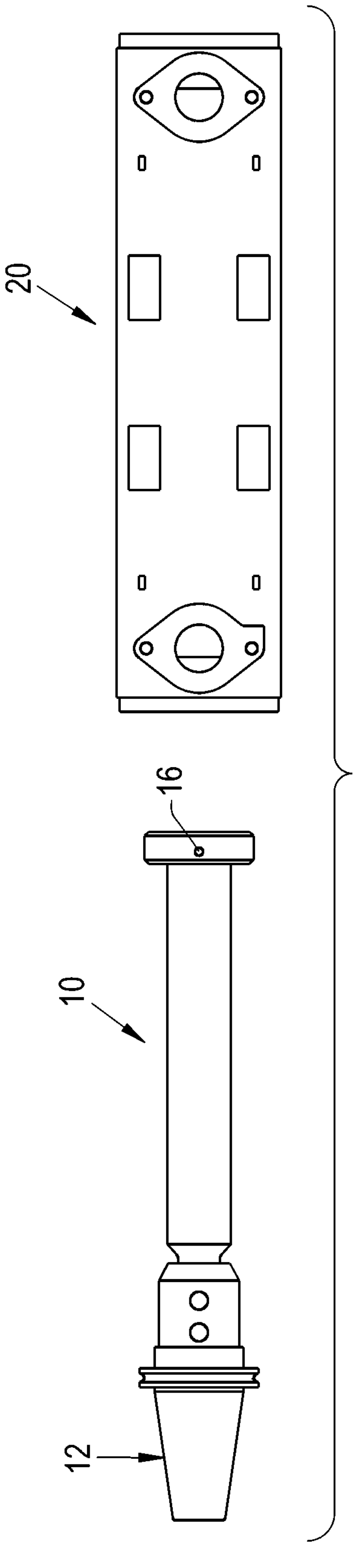
FIG. 4 is a side view of the device illustrated in FIGS. 1-3 before insertion into a part.
Figure 5:
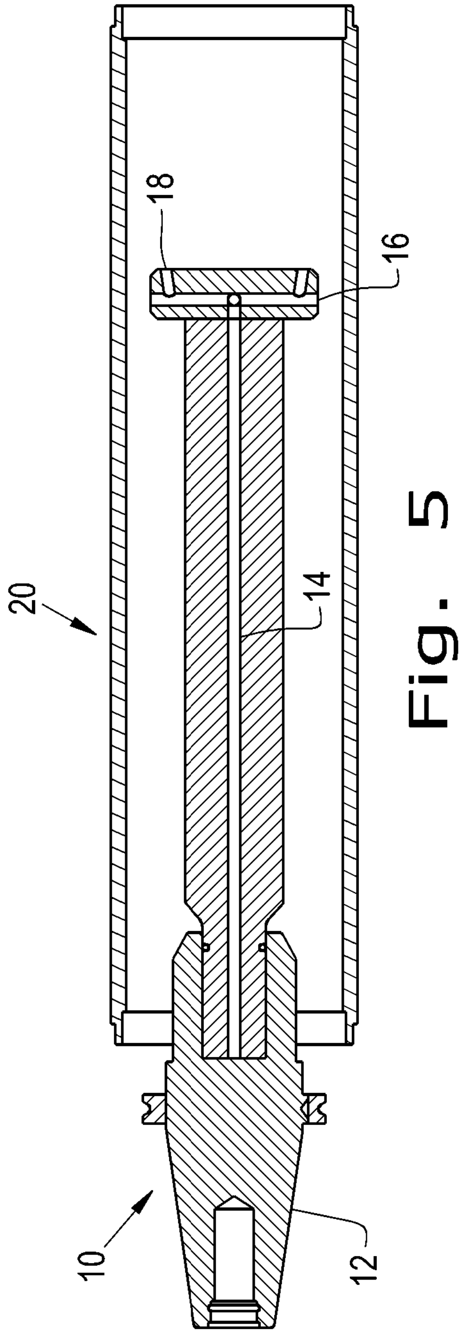
FIG. 5 is a cross-sectional view of the device illustrated in FIGS. 1-3 inserted into the part of FIG. 4.

Now, additionally referring to FIGS. 4 and 5 there is shown the device 10 relative to a part 20. The part 20 has been machined and now the device 10 will enter and dispense fluid from the fluid source 110 therein to clean, flush, deburr and dry a surface of the part 20.

Fluid flow from the fluid dispensers 16 may mate with part of part 20, such as cavities or flow channels formed therein in order for fluid from the device 10 to clean, dry, deburr and/or flush machined part 20.

Through coolant is typically used for cooling the cutting tools and flushing chips away from the cutting edge. In the present invention, device 10 is used to harness the coolant to also wash/clean the part 20. At sufficiently high fluid pressures, the coolant can also remove burs that form during machining of the part 20. After flushing the part 10 with coolant, the fluid source 110 can be switched to a dry mode so pressurized gas, such as pressurized air, is delivered by the device 10 against the part 20 in order to dry the part 20. Thus, it should be appreciated that the fluid source 110 can be configured to deliver both pressurized liquids, such as coolant, and pressurized gas, such as air, to the device 10 for dispensing through the fluid dispensers 16.

The device 10 functions as a coolant nozzle that washes, flushes and dries the part 20, and may be used to deburr internal workpiece features of part 20.

Figure 6:
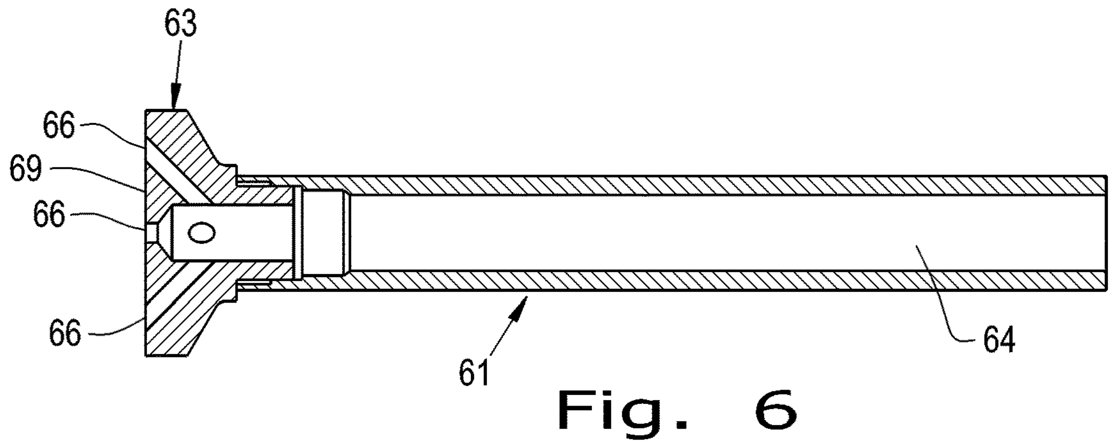
FIG. 6 is a cross-sectional view of an exemplary embodiment of a spindle and a fluid distributer, provided according to the present invention.
Figure 7:
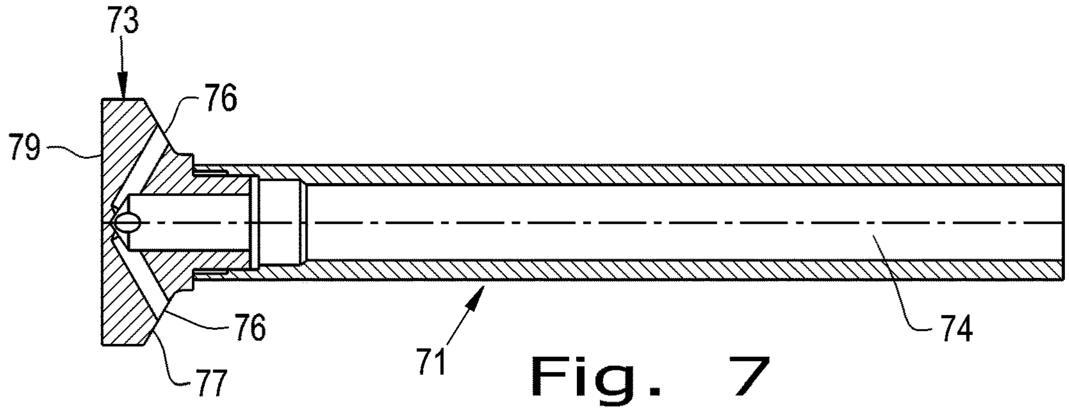
FIG. 7 is a cross-sectional view of another exemplary embodiment of a spindle and a fluid distributer, provided according to the present invention.

Referring now to FIGS. 6 and 7, additional exemplary embodiments of spindles 61, 71 and fluid distributers 63, 73 that can be used in place of the previously described spindle 11 and fluid distributer 13 provided according to the present invention are illustrated. The spindles 61, 71 can be similar to the previously described spindle 11 in that each spindle 61, 71 defines a respective fluid passageway 64, 74 therein. Each of the fluid distributers 63, 73 has a plurality of spaced apart fluid dispensers 66, 76 that are fluidly coupled to the fluid passageway 64, 74 and configured to dispense fluid outside the device 10. Specifically referring to FIG. 6, it can be seen that the fluid dispensers 66 may extend through an end face 69 of the fluid distributer 63. Some of the fluid dispensers 66, which may be formed as passageways in the fluid distributer 63, may extend at an acute angle relative to the fluid passageway 64 while one or more of the fluid dispensers 66 may extend in parallel with the fluid passageway 64. Specifically referring to FIG. 7, it can be seen that the fluid dispensers 76 may extend out of a conical surface 77 of the fluid distributer 73. In some embodiments, the fluid dispensers 76 extend rearwardly, i.e., away from an end face 79 of the fluid distributer 73, at an acute angle relative to the fluid passageway 74. In other respects, the spindles 61, 71 and fluid distributers 63, 73 may be similar to the previously described spindle 11 and fluid distributer 13.

Figure 8:
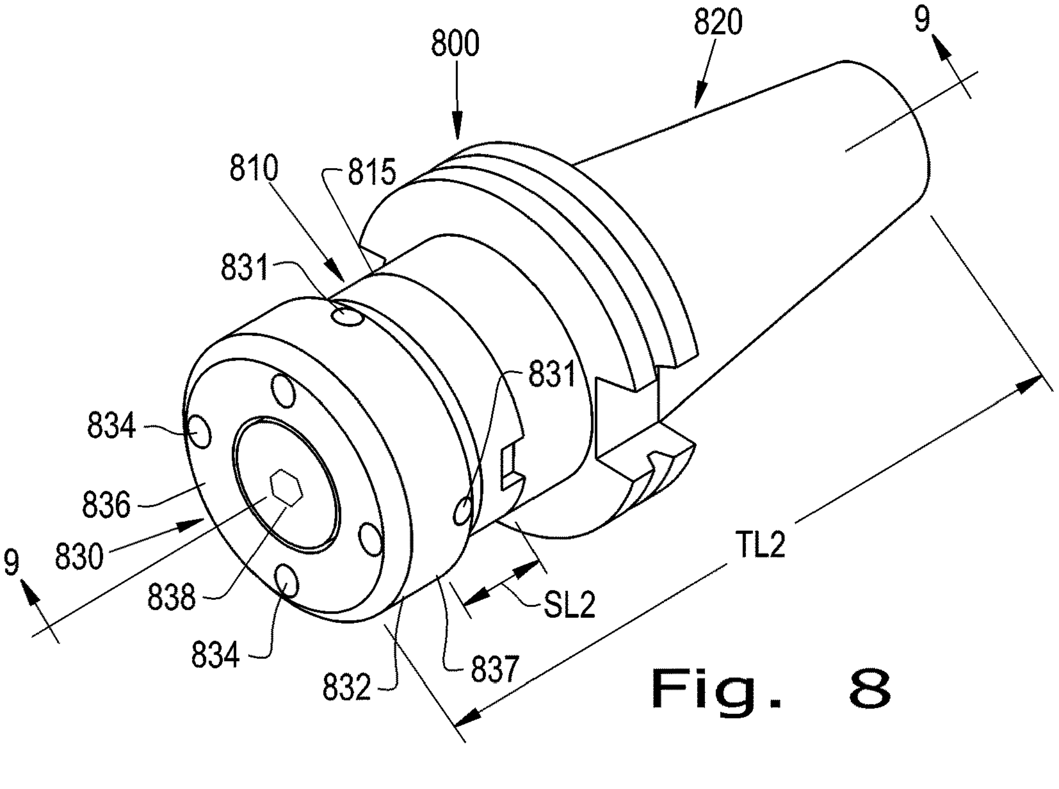
FIG. 8 is a perspective view of another exemplary embodiment of a device for directing high pressure fluid, provided according to the present invention.
Figure 9:
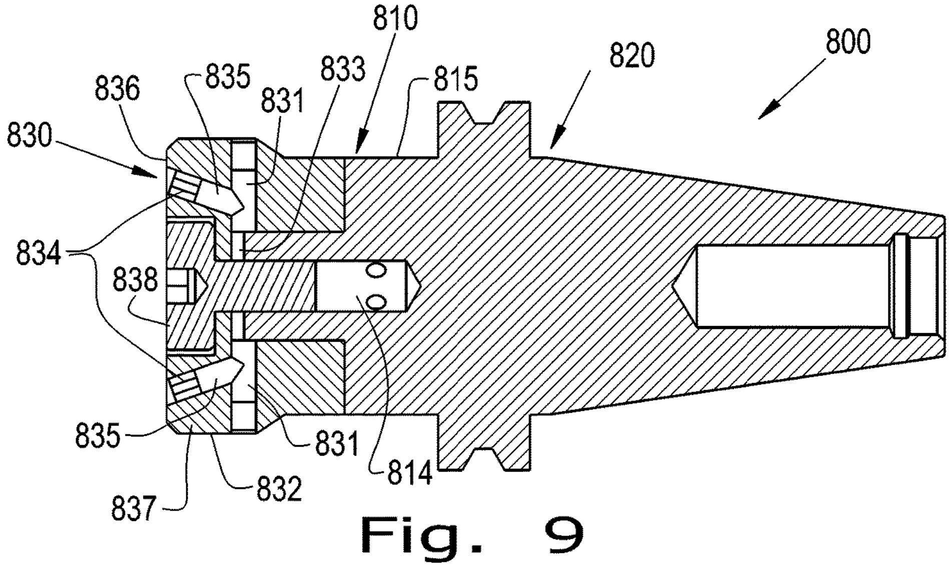
FIG. 9 is a cross-sectional view of the device illustrated in FIG. 8 taken along line 9-9.

Referring now to FIGS. 8-9, another exemplary embodiment of a device 800 for directing high pressure provided according to the present invention is illustrated. The device 800 includes a spindle 810, a spindle mount 820 configured to mount the spindle 810 to a fluid source, such as the previously described fluid source 110, and a fluid distributer 830 coupled to the spindle 810. The spindle mount 820 is similar to the previously described spindle mount 12. The spindle 810 and the fluid distributer 830, on the other hand, are modified compared to the previously described spindle 11 and fluid distributer 13.

As can be appreciated from FIGS. 8-9, the spindle 810 of the device 800 has a rigid body 815 defining a fluid passageway 814 therein and a relatively short length compared to the previously described spindle 11. Unlike the spindle 11, which has a spindle length SL that is more than 50% of the total length TL of the device 10, the spindle 810 of the device 800 illustrated in FIGS. 8-9 has a spindle length SL2 that is a small percentage of a total length TL2 of the device 800, such as less than 20% of the total length TL2. In other respects, the spindle 810 may be similar to the previously described spindle 11.

The fluid distributer 830 has a plurality of spaced-apart fluid dispensers 831 that are each fluidly coupled to the fluid passageway 814 and configured to dispense fluid outside the device 800. Each of the fluid dispensers 831 may extend through a circumferential surface 832 of the fluid distributer 830 and be fluidly coupled to the fluid passageway 814 via a distributer channel 833. The fluid distributer 830 may include a plurality of flow adjusters 834, with each of the flow adjusters 834 being associated with a respective one of the fluid dispensers 831 and configured to control fluid flow from the respective fluid dispenser 831 independently of the other fluid dispensers 831. Each of the flow adjusters 834 may be a threaded screw that is held in a respective adjuster channel 835 formed through an end face 836 of the fluid distributer 830. The end face 836 may be coupled to a ring 837 of the fluid distributer 830 by a single coupling nut 838, which can be removed to separate the end face 836 from the ring 837 for cleaning. In other respects, the fluid distributer 830 may be similar to the previously described fluid distributer 13.

Figure 10:
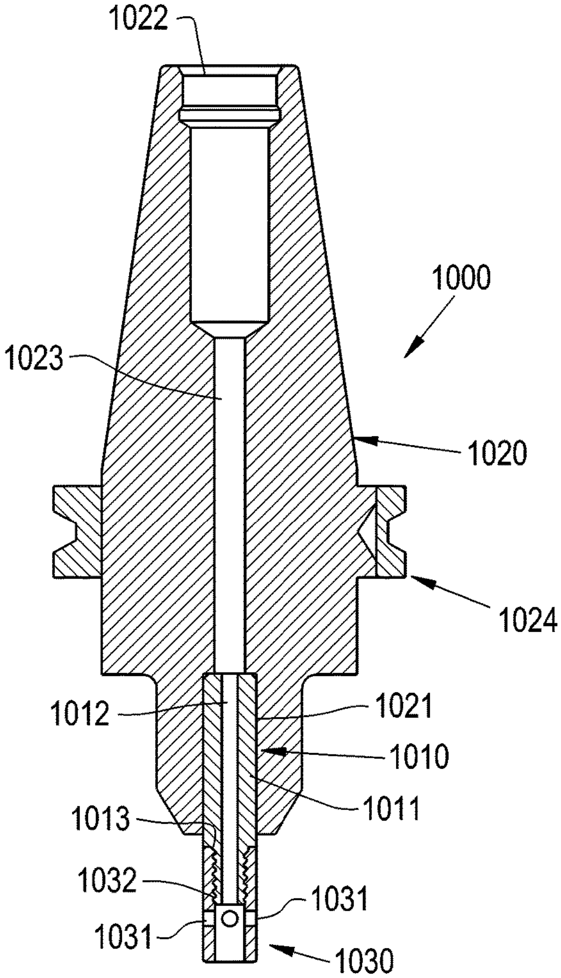
FIG. 10 is a cross-sectional view of another exemplary embodiment of a device for directing high pressure fluid, provided according to the present invention.
Figure 11:
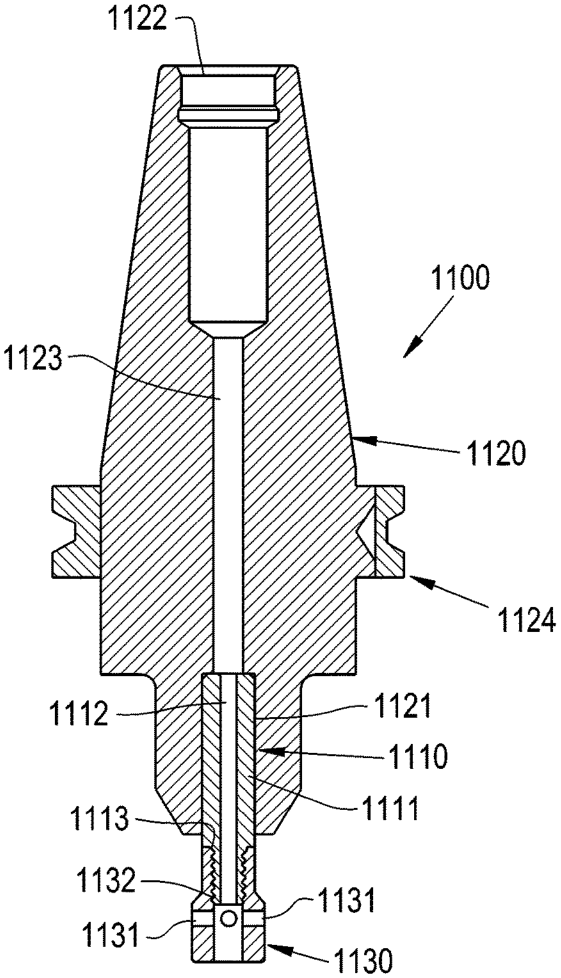
FIG. 11 is a cross-sectional view of another exemplary embodiment of a device for directing high pressure fluid, provided according to the present invention.

Referring now to FIGS. 10 and 11, additional exemplary embodiments of devices 1000, 1100 for directing high pressure fluid provided according to the present invention are illustrated. As illustrated, both devices 1000, 1100 include a spindle 1010, 1110, a spindle mount 1020, 1120 configured to mount the spindle 1010, 1110 to a fluid source, such as the previously described fluid source 110, and a fluid distributer 1030, 1130. The spindle mount 1020, 1120 of the devices 1000, 1100 may each include a spindle opening 1021, 1121 that receives the spindle 1010, 1110 and holds the spindle 1010, 1110 therein. Similar to previously described spindle mounts, the spindle mounts 1020, 1120 may each have a fluid entryway 1022, 1122 defined therein that is configured to fluidly couple to the fluid source 110. In some embodiments, the spindle mounts 1020, 1120 also have a mount passageway 1023, 1123 that is fluidly coupled to the fluid entryway 1022, 1122 and has a smaller diameter than the fluid entryway 1022, 1122. Each spindle mount 1020, 1120 may also include one or more mounting features 1024, 1124 that is configured to mount the device 1000, 1100 to the fluid source 110, similarly to the previously described mounting features 21.

Each spindle 1010, 1110 includes a rigid body 1011, 1111 that is held in the spindle opening 1021, 1121. The rigid body 1011, 1111 has a fluid passageway 1012, 1112 defined therein that is fluidly coupled to the fluid entryway 1022, 1122 via the mount passageway 1023, 1123. In some embodiments, the fluid passageway 1012, 1112 defines a passageway diameter that is less than the diameter of the mount passageway 1023, 1123. The rigid body 1011, 1111 may also include threads 1013, 1113 for mounting the fluid distributer 1030, 1130 thereon.

The fluid distributer 1030, 1130 has a plurality of spaced-apart fluid dispensers 1031, 1131 that are each fluidly coupled to the fluid passageway 1012, 1112 and configured to dispense fluid outside of the device 1000, 1100. The fluid distributer 1030, 1130 may include threads 1032, 1132 that correspond to the threads 1013, 1113 of the spindle 1010, 1110 to removably mount the fluid distributer 1030, 1130 to the spindle 1010, 1110. As previously described, a flow adjuster may be associated with each fluid dispenser 1031, 1131 and configured to adjust fluid from its respective fluid dispenser 1031, 1131 independently of the other fluid dispensers 1031, 1131.

As can be appreciated from FIG. 10, the spindle 1010 and the fluid distributer 1030 of the device 1000 can each have a diameter that is generally the same. The diameter of the spindle 1010 and the fluid distributer 1030 may be, for example, 0.375". Other exemplary diameters are 0.5" and 0.75", but it should be appreciated that the relative diameters can be adjusted to conform to the desired fluid flow characteristics and/or the part that is to receive the dispensed fluid. The spindle 1110 and the fluid distributer 1130 of the device 1100 illustrated in FIG. 11, on the other hand, may have diameters that differ. As illustrated, the fluid distributer 1130 may, for example, have a slightly greater diameter than the spindle 1110. Thus, it should be appreciated that the respective diameters of the spindle 1010, 1110, the spindle mount 1020, 1120, and the fluid distributer 1030, 1130 can be adjusted in a variety of ways, depending on the application of the device.

From the foregoing, it should be appreciated that the devices 10, 800, 1000, 1100 provided according to the present invention can be used in fluid distribution systems to clean, debur, and/or dry surfaces, such as surfaces of parts, using pressurized fluid from a fluid source 110. The fluid flow from the devices can be precisely controlled using flow adjusters and/or by adjusting the location of the fluid dispensers in the devices. Thus, the devices provided according to the present invention provide a wide variety of ways of dispensing fluid that can be tailored to a variety of specific applications.

Figure 12:
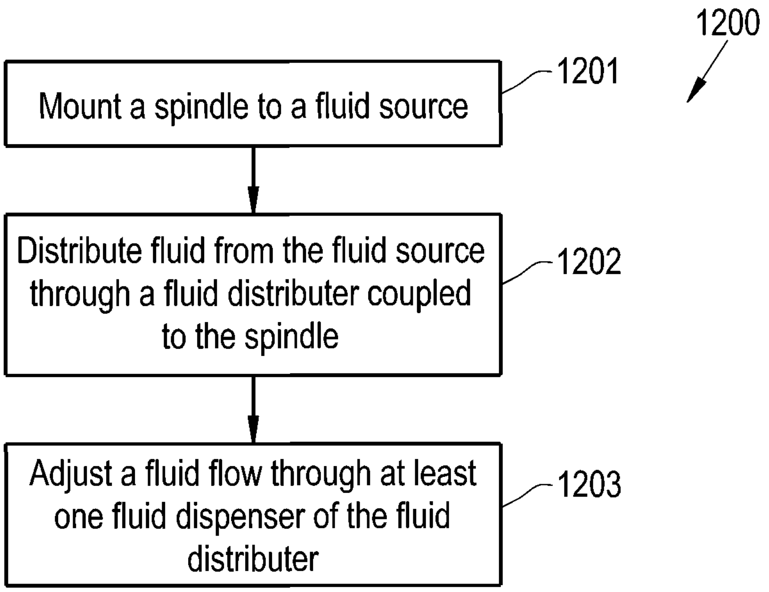
FIG. 12 is a flowchart illustrating an exemplary embodiment of a method of treating a surface, provided according to the present invention.

Referring now to FIG. 12, an exemplary embodiment of a method 1200 of treating a surface, such as a surface of a part 20, is provided. The method 1200 includes mounting 1201 a spindle 11, 810, 1010, 1110 comprising a rigid body 15, 815, 1011, 1111 to a fluid source 110 using a spindle mount 12, 820, 1020, 1120 such that a fluid passageway 14, 814, 1012, 1112 formed in the rigid body 15, 815, 1011, 1111 of the spindle 11, 810, 1010, 1110 is fluidly coupled to the fluid source 110; and distributing 1202 pressurized fluid from the fluid source 110 through a fluid distributer 13, 830, 1030, 1130 that is coupled to the spindle 11, 810, 1010, 1110 and placed adjacent to the surface. The fluid distributer 13, 830, 1030, 1130 has a plurality of spaced-apart fluid dispensers 16, 831, 1031, 1131 formed therein that are each fluidly coupled to the fluid passageway 14, 814, 1012, 1112 so the pressurized fluid is dispensed from at least one of the fluid dispensers 16, 831, 1031, 1131 against the surface. In some embodiments, the method 1200 includes adjusting 1203 a fluid flow through at least one of the fluid dispensers 16, 831, 1031, 1131 by adjusting a respectively associated flow adjuster 18, 834 that is associated with the fluid dispenser 16, 831, 1031, 1131 and configured to control fluid flow through the fluid dispenser 16, 831, 1031, 1131 independently of the other fluid dispensers 16, 831, 1031, 1131. In some embodiments, the distributed pressurized fluid may be a first fluid, such as a coolant, to clean and debur the surface followed by a second fluid, such as air, to dry the surface after cleaning.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A device for directing high pressure fluid, comprising:
- a spindle comprising a rigid body defining a fluid passageway therein;
- a spindle mount configured to mount the spindle to a fluid source, wherein the spindle mount defines a fluid entryway that is fluidly coupled to the fluid passageway of the spindle; and
- a fluid distributer coupled to the spindle and comprising a plurality of spaced-apart fluid dispensers formed therein that are each fluidly coupled to the fluid passageway and configured to dispense fluid outside the device, the fluid distributer including an outer circumferential surface and each of the fluid dispensers extend through the outer circumferential surface, the fluid distributer further including a plurality of flow adjusters, each of the flow adjusters being associated with a respective one of the fluid dispensers and configured to control fluid flow from the respective fluid dispenser independently of the other fluid dispensers, wherein the plurality of flow adjusters comprises at least one adjusting screw, the fluid distributer comprising a circular end face that is coupled to a ring including the outer circumferential surface through which the fluid dispensers extend, each of the flow adjusters being disposed in a respective adjuster opening formed in the circular end face, each of the fluid dispensers being formed as an opening in the outer circumferential surface and being configured so that fluid sprays from the opening outside the device.

2. The device of claim 1, wherein the fluid passageway defines a passageway diameter and the fluid entryway defines an entryway diameter that is greater than the passageway diameter.

3. The device of claim 1, wherein the spindle defines a spindle diameter and the fluid distributer defines a distributer diameter that is less than or greater than the spindle diameter.

4. The device of claim 1, wherein the spindle defines a spindle length that is at least 50% of a total length of the device.

5. A fluid distribution system, comprising:
- a fluid source configured to output pressurized fluid; and
- a device comprising:
  - a spindle comprising a rigid body defining a fluid passageway therein;
  - a spindle mount mounting the spindle to the fluid source so the fluid passageway of the spindle is fluidly coupled to the fluid source, wherein the spindle mount defines a fluid entryway that is fluidly coupled to the fluid passageway of the spindle; and
  - a fluid distributer coupled to the spindle and comprising a plurality of spaced-apart fluid dispensers formed therein that are each fluidly coupled to the fluid passageway of the spindle and configured to dispense pressurized fluid from the fluid source outside the device, the fluid distributer including an outer circumferential surface and each of the fluid dispensers extend through the outer circumferential surface, the fluid distributer further including a plurality of flow adjusters, each of the flow adjusters being associated with a respective one of the fluid dispensers and configured to control fluid flow from the respective fluid dispenser independently of the other fluid dispensers, wherein the plurality of flow adjusters comprises at least one adjusting screw, the fluid distributer comprising a circular end face that is coupled to a ring including the outer circumferential surface through which the fluid dispensers extend, each of the flow adjusters being disposed in a respective adjuster opening formed in the circular end face, each of the fluid dispensers being formed as an opening in the outer circumferential surface and being configured so that fluid sprays from the opening outside the device.

6. The fluid distribution system of claim 5, wherein the fluid passageway defines a passageway diameter and the fluid entryway defines an entryway diameter that is greater than the passageway diameter.

7. The fluid distribution system of claim 5, wherein the spindle defines a spindle diameter and the fluid distributer defines a distributer diameter that is less than or greater than the spindle diameter.

8. The fluid distribution system of claim 5, wherein the spindle defines a spindle length that is at least 50% of a total length of the device.

9. The fluid distribution system of claim 5, wherein the pressurized fluid is at least one of pressurized air or pressurized coolant.

10. A method of treating a surface, the method comprising:

mounting a spindle comprising a rigid body to a fluid source using a spindle mount such that a fluid passageway formed in the rigid body of the spindle is fluidly coupled to the fluid source; and distributing pressurized fluid from the fluid source through a fluid distributer that is coupled to the spindle and placed adjacent to the surface, the fluid distributer having a plurality of spaced-apart fluid dispensers formed therein that are each fluidly coupled to the fluid passageway of the spindle so the pressurized fluid is dispensed from the fluid dispensers against the surface, the fluid distributer including an outer circumferential surface and each of the fluid dispensers extend through the outer circumferential surface, the fluid distributer further including a plurality of flow adjusters, each of the flow adjusters being associated with a respective one of the fluid dispensers and configured to control fluid flow from the respective fluid dispenser independently of the other fluid dispensers, wherein the plurality of flow adjusters comprises at least one adjusting screw, the fluid distributer comprising a circular end face that is coupled to a ring including the outer circumferential surface through which the fluid dispensers extend, each of the flow adjusters being disposed in a respective adjuster opening formed in the circular end face, each of the fluid dispensers being formed as an opening in the outer circumferential surface so the pressurized fluid sprays from the opening against the surface.

* * * * *